United States Patent [19]

Todd

[11] Patent Number: 4,660,860
[45] Date of Patent: Apr. 28, 1987

[54] FLEXIBLE PIPE COUPLER

[75] Inventor: Harry V. Todd, El Cajon, Calif.

[73] * Assignee: Toddco, El Cajon, Calif.

[21] Appl. No.: 800,171

[22] Filed: Nov. 14, 1985

[51] Int. Cl.⁴ .............................................. F16L 47/00
[52] U.S. Cl. ..................................... 285/12; 285/390;
    285/397; 285/417; 285/383; 285/903
[58] Field of Search ................ 285/12, 903, 175, 370,
    285/397, 355, 390, 383, 417

[56] References Cited

U.S. PATENT DOCUMENTS

| 278,800 | 6/1883 | Kline | 285/175 |
|---|---|---|---|
| 319,144 | 6/1885 | Stephens et al. | 285/903 X |

FOREIGN PATENT DOCUMENTS 484059  4/1976  Australia .............................. 285/903

*Primary Examiner*—Richard J. Scanlan, Jr.
*Attorney, Agent, or Firm*—Bernard L. Kleinke

[57] ABSTRACT

A coupler for interconnecting in fluid communication a pair of axially aligned flexible pipe ends, employs a tubular member for insertion between two sections of drainpipe to be coupled. A first thread is included on a first end portion of the tubular member for threaded engagement of a first one of the two sections of drainpipe, along with a second thread on a second end portion for threaded engagement of the second section. An integrally formed annular flanges in one form of the invention serves as a grip with which to manually screw the tubular member onto the drainpipe, while a cutback portion on the flange prevents misalignment of the coupled sections at the coupling when placed upon the ground. Tapered end pieces that screw onto each end to accommodate smaller drainpipe are provided in another form, with the threads of the tubular member matching the helically-corrugated plastic casing surface of conventional RV drainpipe.

16 Claims, 5 Drawing Figures

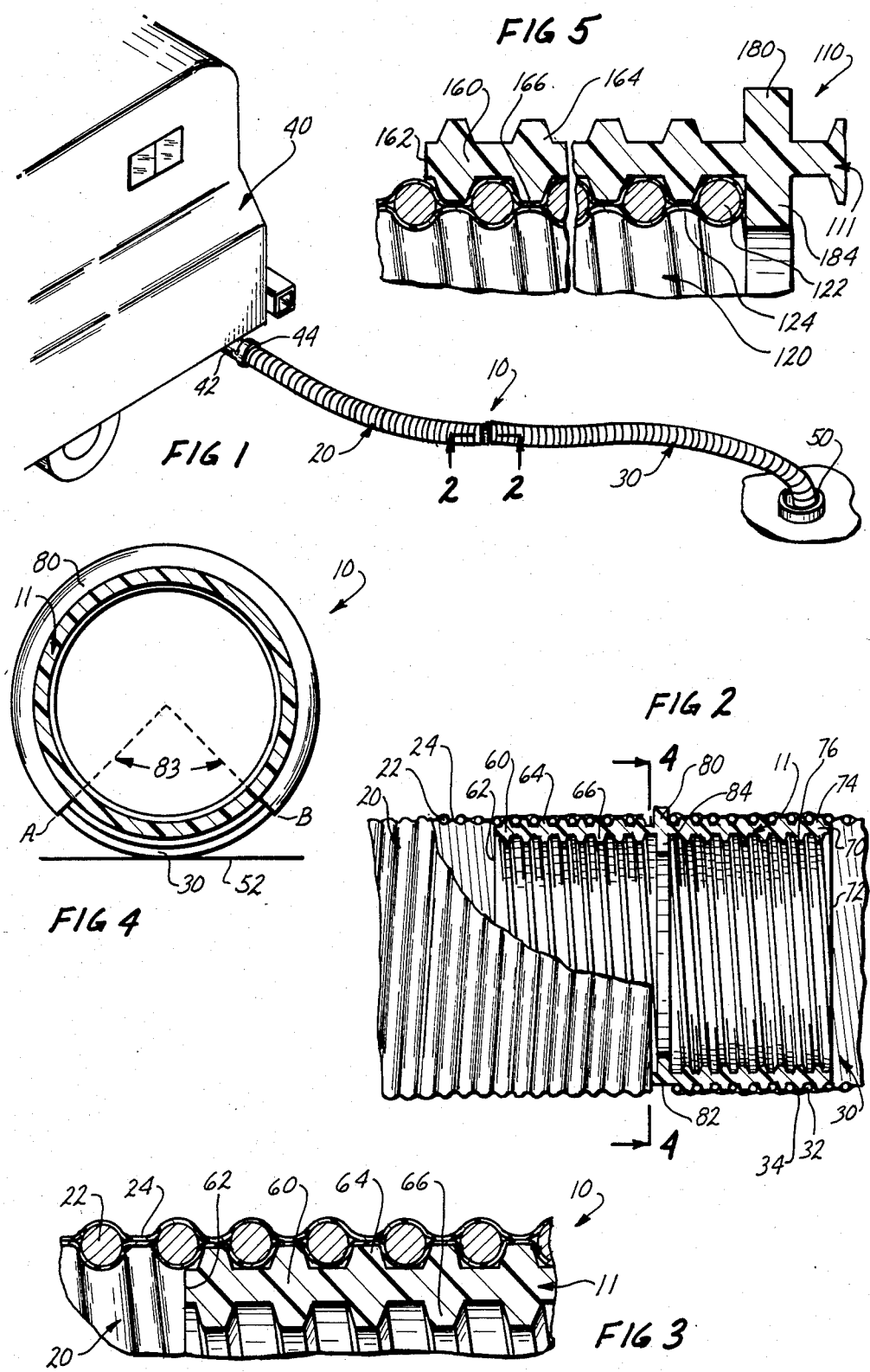

FLEXIBLE PIPE COUPLER

TECHNICAL FIELD

This invention relates generally to flexible pipe couplers, and more particularly to a coupler for corrguated drainpipes commonly employed by recreational vehicles.

BACKGROUND ART

Recreational vehicles vastly improve outdoor life. Like a small cabin on wheels, they house many convenient living accommodations, while providing the mobility that enables rapid transformations from city to country life. Fewer concerns, more time to relax and enjoy, and a welcome degree of security result.

Waste disposal heads the list. A flexible drainpipe typically carries waste under the force of gravity to a point outside the vehicle for disposal. Additional sections of similar line are frequently required to extend the line to a more remote disposal site, when the standard pipe is not sufficiently long to extend the required distance.

Connecting up the additional section of flexible drainpipe is awkward and time consuming, and thus requires extra effort however. The RV drainpipe connectors currently available have not been entirely satisfactory, and are greatly in need of improvement.

Considering first the flexible drainpipe, formed from a coiled spring imbedded within a plastic casing, it offers both the strength and flexibility needed for typical camping use.

A typical conventional coupler or connector is simply a short tube or hollow cylindrical member, designed to be forced into adjoining ends of two axially aligned drainpipe sections. Since the diameters of the pipes and the coupler are substantially the same, it often requires great skill and strength to force the coupler into the end of the pipe to seal them together. Intended to fit closely into the drainpipe ends, the connector must often be pried and pounded into place, perhaps in the rain, perhaps in darkness, but, even on a sunny day, with great difficulty and often with damage to the drainpipe resulting. At the very least, the end of the drainpipe must become deformed by manually applied force to enable it to receive the coupler.

Consequently, it is desirable to have some better, easier to install device—one that can rapidly interconnect adjacent ends of two axially aligned flexible pipes in fluid communication, and be installed with little skill and attention.

Once in place, such couplers often continue to require unwanted attention. They often form an inadequate mechanically strong joint, for example, leaking and easily dislodging if bumped by a squirrel, or accidentally by a campsite vitor. Stress on the joint caused by uneven terrain also produces this result. Thus, it is desirable to have a device that produces a better, stronger, tighter joint.

Disassembly of the extended drainline has its problems as well. Drainpipe must be disassembled after an outing to enable cleaning and storage, and waste material remaining within the drainpipe makes it essential that this be done carefully to avoid strewing the waste about the campsite. Unfortunately, due to the tight friction fit, it is very difficult to forceably pull the coupler out of the end of the pipe, without spilling the waste contained within the pipe.

Existing connectors often only compound the problems, by becoming accidentally dislodged at inopportune times with waste spilling therefrom. Consequently, it is desirable to have a device that functions more predictably in this respect to enable controlled disassembly, to avoid or at least greatly reduce the possibility of spilling waste material.

There have been many different types and kinds of couplers and adapters designed for similar purposes. Refer, for example, to U.S. Pat. Nos. 2,419,453; 2,441,055; 2,885,225; 3,667,787; 3,806,169 and 4,061,368. But none solve the foregoing problems.

DISCLOSURE OF INVENTION

Therefore, the principal object of the present invention is to provide a new and improved device for coupling in fluid communication a pair of axially aligned ends of flexible pipes, such as the type of drainpipe commonly employed on recreational vehicles.

It is a further object to provide such a new and improved coupler that is easy and convenient to install, while providing a joint of adequate mechanical strength and tightness for sealing purposes.

Yet another object of the present invention is to provide such a coupler that is easily and inexpensively manufactured, and can be readily and conveniently disassembled.

Briefly, the above and further objects of the present invention are realized by providing a coupler that employs a tubular member for insertion between two sections of flexible drainpipe to be coupled. A first external thread on a first end portion of the tubular member threadably engages the internal helical corrugated surface of a first one of the two sections of pipe, along with a second external thread on a second end portion for threaded engagement of an internal helical corrugated surface of the second flexible pipe section. Thus, the coupler can be threaded into two adjoining ends, without the need for prying and pounding, and thus without the need for excessive manually applied force.

An integrally formed annular flange in one form of the invention serves as a finger grip with which to thread manually the tubular member into the pipe. A cut-out portion on the flange prevents axial misalignment of the ends of the coupled sections, at the coupling, when placed upon the ground.

Tapered end portions facilitate guiding the end of the coupler into the end of the flexible pipe. Also, the inventive coupler includes first and second pairs of axially aligned, spaced apart internal threads to receive threadable ends of a pair of the smaller diameter flexible pipes. The internal diameter flexible threads on the tubular member match the helically-corrugated plastic casing of the conventional flexible pipe.

Thus, the coupler of this invention achieves the easy and convenient installation desired, while providing a highly superior joint that is tighter, stronger, and far less prone to inopportune dislodgement.

BRIEF DESCRIPTION OF DRAWINGS

The above and other objects and features of this invention and the manner of attaining them will become apparent, and the invention itself will be best understood, by reference to the following description of an embodiment of the invention taken in conjunction with the accompanying drawings, wherein:

FIG. 1 is a pictorial view of two sections of flexible drainpipe interconnected by a coupler constructed according to this invention;

FIG. 2 is an enlarged fragmentary sectional view of the coupler, taken substantially on line 2—2 of FIG. 1 illustrating the coupler threaded into a flexible pipe;

FIG. 3 is a further enlargement of a portion of the sectional view shown in FIG. 2;

FIG. 4 is a transverse sectional view taken substantially on line 4—4 of FIG. 2; and FIG. 5 is an enlarged, fragmentary sectional view of the coupler of FIG. 1 threaded over the end of a smaller diameter flexible drainpipe.

DETAILED DESCRIPTION

Referring now to the drawings, and more particularly to FIG. 1 thereof, there is shown a flexible pipe coupler 10, which is constructed in accordance with the present invention, and which is shown in place within adjoining axially aligned, ends of flexible drainpipe 20 and flexible drainpipe 30 to interconnect them in fluid communication. Drainpipe 20 is connected to a recreational vehicle 40 at drain outlet 42 by conventional coupling device 44. Coupler 10 maintains pipe 20 in fluid communication with section 30, and thus waste flows from the vehicle 40 through flexible pipes 20 and 30, to disposal site inlet 50.

Thus, the coupler 10 of this invention enables interconnection of two sections of conventional flexible drainpipe, to facilitate interconnection of the vehicle drain outlet 42 with a remotely located sewage disposal site. By interconnecting the pipes 20 and 30, end-to-end, a flow path is extended from the outlet 42 to the inlet 50 of the remotely located site.

Referring now to FIG. 2, coupler 10 generally comprises a tubular member 11 that is shaped and suitably dimensioned to fit threadably within the ends of two flexible pipes to be coupled. The coupler 10 is formed from a suitable thermoplastic material injection molded according to well known fabrication methods.

As shown in FIGS. 2-4, tubular member 11 includes a first end portion 60 extending to first distal end 62 for guiding the coupler into the end of a flexible pipe. The taper is slight, and thus is not apparent in the drawings. Exterior threads 64 and interior threads 66 are disposed at the front end at the respective outside and inside thereof. Tubular member 11 also includes a second tapered end 70 extending to the distal end 72, and along which are disposed exterior threads 74 and interior threads 76.

Generally, midway between these two end portions, is located outwardly extending annular flange 80. This flange has a cutback portion 82 along a portion of its periphery. Inwardly extending annular flange 84 is also generally midway between the two end portions. Like outwardly extending annular flange 80, inwardly extending annular flange 84 serves as a stop against which a section of drainpipe is screwed when screwed within the coupler. Thus, outwardly extending annular flange 80 serves as a stop against which illustrated drainpipe sections 20 and 30 are screwed.

Outwardly extending annular flange 80 also serves as a grip that can be grasped with the fingers of the user to thread the coupler 10 into position. It extends radially outwardly a sufficient distance beyond the threads to serve this function.

Cutback portion 82 serves to prevent misalignment of drainpipe section 20 and drainpipe section 30 when placed upon a support surface.

As shown in FIG. 2 and in the enlarged portion thereof in FIG. 3, the threads are shaped and dimensioned to mate with the helically-corrugated shape of the RV drainpipe. Drainpipe section 20, for example, is formed from a coiled hardened steel spring 22 imbedded within a sheet plastic casing 24. Similarly, drainpipe section 30 is formed from a coil of hardened steel 32 imbedded within plastic sheets 34 to produce a helically-corrugated casing. These helically-corrugated casings simulate a standard thread so that by providing the tubular member with a mating thread, the tubular member can be screwed into the drainpipe section to provide a superior coupling.

Further details of cutback portion 82 of the outwardly extending flange 80 are illustrated in FIG. 4. FIG. 4 is a cross section taken on line 4—4 of FIG. 2, with the drainpipe sections shown supported on support surface 52. Cutback section 82 extends from Point A on outwarding extending annular flange 80 to Point B along an arc designated reference numberal 83 in FIG. 4 that is approximately 90 degrees. Thus, the outwardly extending annular flange 80 does not rest upon support surface 52 to elevate and misalign the drainpipe sections. Instead, cutback section 82 enables drainpipe sections 20 and 30 to rest directly upon the support surface in proper alignment without the slight hump that would otherwise affect flow along the drainline thus established.

Turning now to FIG. 5, there is shown another form of a drainpipe coupler constructed in accordance with the invention. Reference numerals are increased by 100 over those designating similar components and FIGS. 1-4. In this alternate form, tubular member 110 is shaped and dimension relative to drainpipe section 120 so that it can be screwed on over the drainpipe section, interior threads 124 being shaped and dimension to mate with the helically-corrugated casing defined by spring 122 within plastic sheets 124. In this application inwardly extending annular flange 184 is called in service as a stop. Futhermore, both coupler 110 in FIG. 5 and coupler 10 of FIGS. 1-4 include both exterior threads and interior threads to enable use with two different sizes of drainpipe.

In operation, the coupler is threaded into the end of one section of drainpipe, and then the other section of drainpipe is screwed onto the coupler. Additional sections are joined in this manner if needed and when an adequate length is achieved, one end is connected to the RV using a conventional coupler, and the other end is placed at the disposal site. When placing the line upon the ground, cutback portion 82 is directly downwardly to avoid producing a hump in the line of the coupling.

Disassembly is equally convenient, the line may be first disconnected from the vehicle, transported by hand away from the RV for removal of the coupler and cleaning, and then brought back to the RV for storage.

Thus, the flexible drainpipe coupler of this invention provides a significant improvement over prior art couplers.

As various changes may be made in the form, construction, and arrangement of the procedures and parts described herein, without departing from the spirit and scope of the invention and without sacrificing any of its advantages, all matter herein is to be interpreted as illustrative and not in any limiting sense.

What is claimed is:

1. A coupler for coupleing recreational vehicle spirally corrugated drainpipe, which comprises:
    a tubular member of unitary one-piece construction and thermoplastic composition for insertion between two sections of drainpipe to be coupled, the tubular member having a first end portion and a second end portion;
    said tubular member having an enlarged annular flange portion extending radially therefrom intermediate the first and second end portions, said annular flange portion defining a pair of first and second outwardly-extending stop means facing respective ones of the first and second end portions;
    a first thread portion of the first end portion defining an integral raised helical thread adapted for threaded engagement of a first one of the two sections of drainpipe, the first thread portion extending from a distal end of the first end portion toward and slightly spaced apart from the first abutment surface;
    a second thread portion of the second end portion defining an integral raised helical thread adapted for threaded engagement of a second one of the two sections of drainpipe, the second thread portion extending from a distal end of the second end portion toward and slightly spaced apart from the second abutment surface; and
    said tubular member having means defining a pair of spaced disposed between respective ones of said stop means and the respective thread portions for enabling the ends of the first and second sections of drainpipe to extend into said spaces and to engage respective ones of said stop means.

2. A coupler as recited in claim 1, wherein:
    the first thread and the second thread are each an exterior thread.

3. A coupler as recited in claim 1, wherein:
    the first thread and the second thread are each an interior thread.

4. A coupler as recited in claim 1, wherein:
    the first end portion has both an exterior thread and an interior thread; and
    the second end portion has both an exterior thread and an interior thread.

5. A coupler as recited in claim 1, wherein:
    the first thread is a righthand thread and the second thread is a lefthand thread.

6. A coupler as recited in claim 1, further comprising:
    an annular flange portion attached to the tubular member between the first end portion and the second end portion.

7. A coupler as recited in claim 6, wherein:
    the annular flange portion includes gripping means for enabling gripping engagement of the annular flange portion.

8. A coupler as recited in claim 6, wherein:
    the tubular member and annular flange portion are of unitary construction.

9. A coupler as recited in claim 6, wherein:
    the annular flange has a periphery adapted to be engaged with a wrench.

10. A coupler as recited in claim 9, wherein:
    the periphery has a hexagonal shape.

11. A coupler as recited in Claim 1, further comprising:
    end pieces of the end portions of the tubular member, the end pieces having a proximal end, a distal end, and an exteriorly threaded tubular portion therebetween that decreases in outside diameter from the proximal end to the distal end; and
    attachment means including said annular flange portion for enabling attachment of the each distal end to one of the drainpipe end portions.

12. A coupler as recited in claim 11, which includes:
    a righthand-threaded first end piece for attachment to the first end portion; and
    a lefthand-threaded second end piece for attachment to the second end portion.

13. A coupler as recited in claim 1, wherein:
    both the first thread and the second thread match a conventional spirally corrugated drainpipe casing surface.

14. A coupler for coupling, recreational vehicle spirally corrugated drainpipes which comprises:
    a tubular member for insertion between two sections of drainpipe to be coupled, the tubular member having a first end portion and a second end portion, each one of the end portions being adapted for threaded engagement of a corresponding one of the two sections of drainpipe;
    an annular flange integrally attached to the tubular member generally midway between the first end portion and the second end portion, the annular flange having a periphery adapted to enable manual gripping; and
    first and second end portions, proximal end, a distal end, an exteriorly threaded tubular portion therebetween that decreases in outside diameter from the proximal end to the distal end, and means including said flange for enabling manual threading of each one of the end pieces into the corresponding drainpipe section.

15. A coupler as recited in claim 14, wherein:
    both the first end portion and the second end portion have threads that match the spirally corrugated surface of a conventional recreational vehicle drainpipe.

16. A coupler for coupling recreational vehicle drainpipe, which comprises:
    a tubular member for insertion between two sections of drainpipe to be coupled, the tubular member having a first end portion and a second end portion;
    a first thread on the first end portion that is adapted for threaded engagement of a first one of the two sections of drainpipe;
    a second thread on the second end portion that is adapted for threaded engagement of a second one of the two sections of drainpipe; and
    an annular flange portion attached to the tubular member between the first end portion and the second end portion, the annular flange having a cutback portion to prevent misalignment of a coupled line at the coupling when placed upon a support surface.

* * * * *

UNITED STATES PATENT OFFICE
CERTIFICATE OF CORRECTION

PATENT NO. : 4,660,860
DATED : April 28, 1987
INVENTOR(S) : Harry V. Todd

It is certified that error appears in the above-identified patent and that said Letters Patent are hereby corrected as shown below:

Column 1, Line 6: "corrguated" should be --corrugated--.

Column 1, Line 58: "vitor" should be --visitor--.

Column 5, Line 2: "coupleing" should be --coupling--.

Column 6, Lines 35-36: "first and second end portions," should be --said first and second end portions each having a--.

Signed and Sealed this

Eighth Day of September, 1987

Attest:

DONALD J. QUIGG

Attesting Officer

Commissioner of Patents and Trademarks